United States Patent [19]

Jenkins

[11] Patent Number: 5,529,472

[45] Date of Patent: Jun. 25, 1996

[54] VACUUM MOLDING APPARATUS FOR FORMING A SHEET OF PLASTIC MATERIAL INTO A PREDETERMINED SHAPE

[76] Inventor: Henry H. Jenkins, 1236 Disk Dr. Suite C & D, Medford, Oreg. 97501

[21] Appl. No.: 231,403

[22] Filed: Apr. 22, 1994

[51] Int. Cl.⁶ .................................................. B29C 51/10
[52] U.S. Cl. ....................................... 425/388; 425/405.1
[58] Field of Search .................................. 425/388, 405.1

[56] References Cited

U.S. PATENT DOCUMENTS

| | | | |
|---|---|---|---|
| 2,478,165 | 8/1949 | Collins | 425/388 |
| 2,911,677 | 11/1959 | Weber | 425/388 |
| 3,207,821 | 9/1965 | Jones-Hinton et al. | 425/388 |
| 3,504,070 | 3/1970 | Zaharski | 425/388 |
| 3,512,335 | 5/1970 | Rorer | 425/388 |
| 3,816,051 | 6/1974 | Houghton | 425/388 |
| 5,023,042 | 6/1991 | Efferding | 425/388 |
| 5,108,532 | 4/1992 | Thein et al. | 425/388 |
| 5,116,216 | 5/1992 | Cochran et al. | 425/388 |
| 5,130,071 | 7/1992 | Iseler et al. | 425/388 |
| 5,314,324 | 5/1994 | Wendt | 425/388 |

FOREIGN PATENT DOCUMENTS

| | | | |
|---|---|---|---|
| 5-212781 | 8/1993 | Japan | 425/388 |

*Primary Examiner*—Tim Heitbrink
*Attorney, Agent, or Firm*—Woodling, Krost & Rust

[57] ABSTRACT

An apparatus for performing a vacuum forming operation utilizing first and second vacuum producing devices connected to an air space beneath a heated plastic film which is located over a mold in which the film is to be shaped or molded. The first vacuum producing device is capable of removing a relatively large volume of air from the air space and producing a relatively weak vacuum. The second vacuum producing device is capable of removing a relatively small volume of air and producing a relatively high or strong vacuum. This enables the initial portion of the vacuum forming method to rapidly remove a large volume of air with a relatively inexpensive turbine type mechanism and produce a small or weak vacuum and once this has been accomplished, then the second vacuum producing device is activated which rapidly removes the small amount of air remaining and produces a relatively high vacuum. A valve member is provided and is biased to a closed position to prevent fluid flow between the first vacuum device and the air space. Upon initial actuation of the first vacuum device, the valve is caused to move to open position against its biasing and upon production of the relatively weak vacuum, the valve member closes. This disconnects the first vacuum device from the air space and thereafter a second valve device connecting the second vacuum device to the air space is actuated connecting the second vacuum device to the air space which creates a relatively strong vacuum and assists in holding the valve member closed.

2 Claims, 3 Drawing Sheets

VACUUM MOLDING APPARATUS FOR FORMING A SHEET OF PLASTIC MATERIAL INTO A PREDETERMINED SHAPE

The present invention relates to a vacuum molding apparatus and method which accomplishes a vacuum forming procedure in a more efficient and economical fashion than heretofore accomplished.

BACKGROUND OF THE INVENTION

In conventional vacuum forming apparatus and processes, a heated plastic film or sheet is caused to be drawn into the form of a mold by the production or by the introduction of a vacuum beneath the sheet. The films may be polyethylene and polyropylene or similar materials. Air is evacuated from the space beneath the sheet causing the heated sheet to closely conform to the shape of the mold. The sheet so formed is held in this position for an appropriate period of time so it will retain its formed shape upon cooling.

In conventional present-day methods, the removal of air from beneath the heated plastic, thus producing a vacuum, has been accomplished in a number of ways. In one system, vacuum is produced in a relatively large capacity tank—large in comparison to the volume of air that must be removed from beneath the heated plastic sheet in order to cause the plastic sheet to conform to the shape of the mold. The vacuum or negative pressure is then connected to the area beneath the heated plastic sheet and the vacuum forming operation is quickly accomplished.

The disadvantage in this type of system is the requirement of an inordinately large tank resulting in the large cost and the necessity of accommodating the large tank as part of the apparatus.

Another method of accomplishing the desired results is to provide a very large capacity vacuum pump that can be utilized to produce the desired vacuum—i.e. the rapid removal of air necessary to produce the vacuum. The disadvantage of this method is the cost of a vacuum pump necessary to produce the desired vacuum is inordinately high and not an efficient use of the pump's capacity.

A compromise between the two referred to solutions is simply to use a smaller vacuum pump or a smaller tank in which the vacuum is initially produced and before it is connected to the space to be evacuated. However, this takes more time for the vacuum forming operation to be accomplished, resulting in cooling of the heated film and more difficulty forming it into the desired shape.

SUMMARY OF THE INVENTION

The present invention solves the above referred to problems by utilizing two sources of vacuum production to remove the air beneath the heated sheet and produce a vacuum in this space.

The first means of producing the vacuum is a relatively high volume means of removing air from the space resulting in the production of a relatively low or weak vacuum. In other words, the first means will relatively rapidly remove a large volume of air but is only capable of producing a relatively weak vacuum in the space beneath the heated film. The invention then contemplates the use of a second vacuum means to connect to the space being evacuated which is capable of removing a relatively small or low volume of air and producing a relatively high or strong vacuum in terms of the negative pressure in the space. In quantitative terms the relatively weak vacuum that is being referred to is something on the order of four or five inches of mercury and the relatively high or strong vacuum referred to produced by the second means is on the order of 27 to 30 inches of mercury.

With the structure and operation of the present invention the vacuum is efficiently and economically produced resulting in an efficient and economical vacuum forming apparatus and method.

Other more specific objects of the invention will be set forth in the description to follow of a preferred embodiment, and the claims appended herewith to and drawings, in which:

DESCRIPTION OF THE PREFERRED EMBODIMENT

Figure 1:
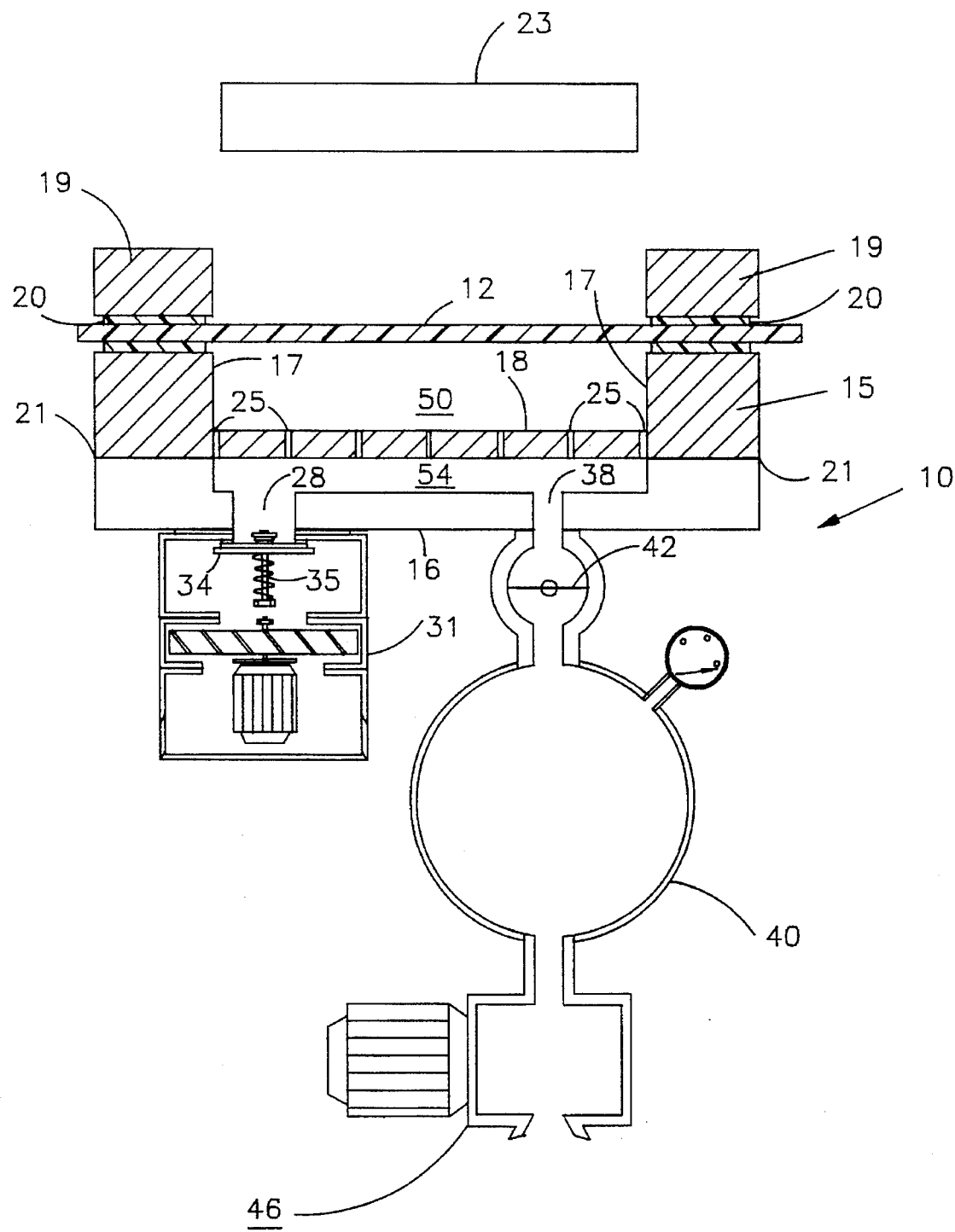
FIG. 1 is a diagrammatic illustration of the apparatus used to accomplish the method of the present invention in one of its conditions of operation.

The apparatus of the present invention is illustrated generally by the reference numeral 10 and includes a mold 15 which is provided with two vertically extending walls 17 interconnected by a bottom wall 18.

A film or plastic sheet 12 is adapted to be held in position relative to the mold by clamping members 19 which engage the plastic at opposed ends to hold the plastic between the upper surfaces of walls 17. Seals 20 of rubber or the like prevent the escape or passage of air. The film or plastic sheet 12, walls 17 and 18 serve to define what will be referred to herein as a closed air space 50. A heater or furnace 23 is provided for the purpose of heating the film 12 as part of the vacuum forming process to be described herein.

A platen 16 is secured to the bottom of the mold 15 by means not specifically illustrated and rubber seals 21 serve to prevent the passage of air at the points of interconnection. The platen in combination with the mold serves to define what has been referred to as manifold or manifold area 54. The bottom wall 18 of the mold is provided with a plurality of openings or apertures 25 to provide for the passage of air from the space 50 to the manifold area 54 during the process.

Figure 2:
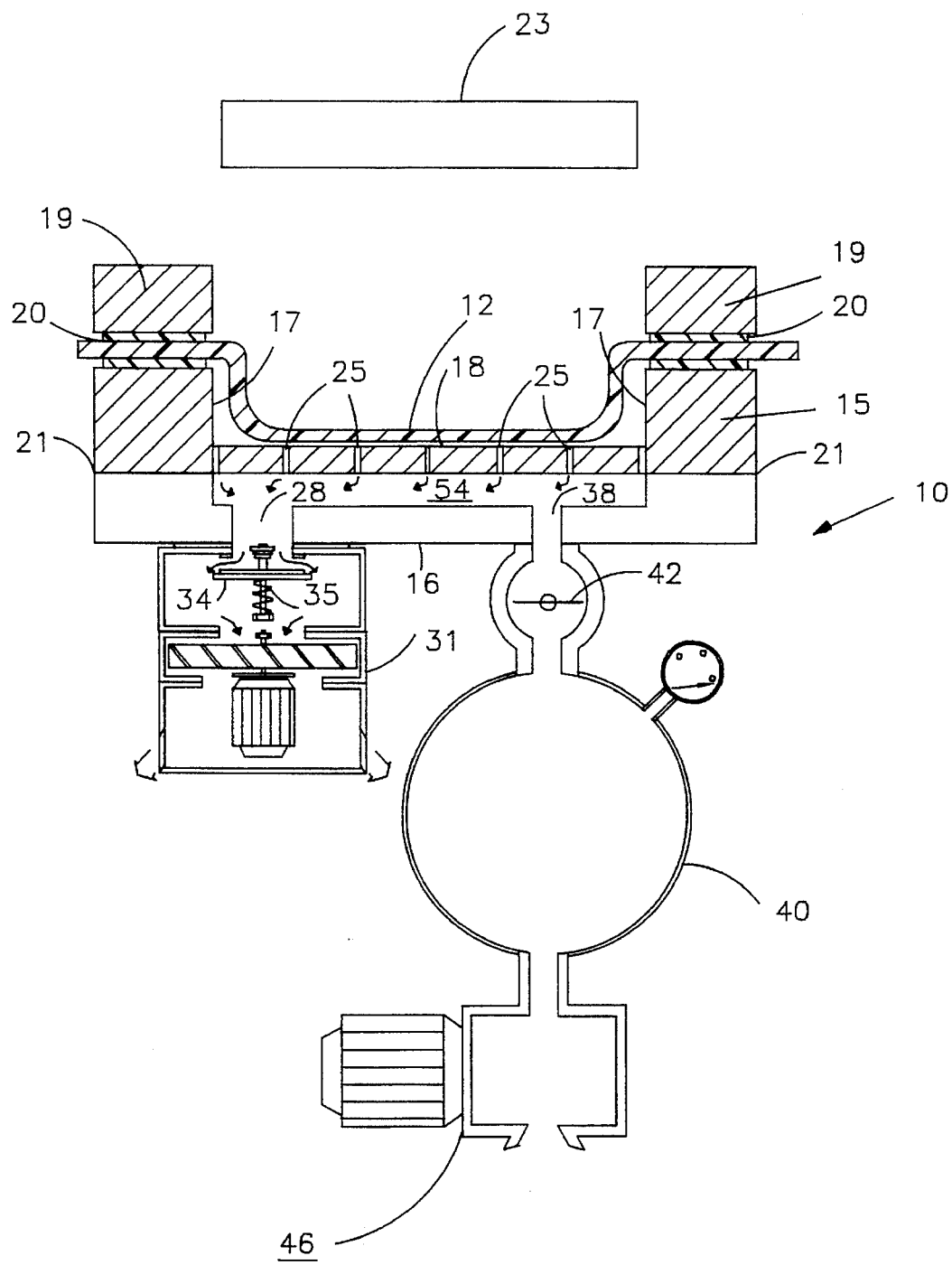
FIG. 2 is a view similar to FIG. 1 illustrating the first vacuum producing means in operation and showing the heated plastic film drawn into a position in the mold where it generally conforms to the shape of the mold.

A port 28 provides for the passage of air from the manifold 54 into a first vacuum producing means 31 in the form of a vacuum producing turbine. A valve 34 which is spring 35 biased to its closed condition as illustrated in FIG. 1 serves to prevent the passage of air through port 28 in its closed condition. The turbine 31 is preferably electrically driven and air from the manifold 54 travels to the turbine and exits the turbine as illustrated in FIG. 2 by the arrows in the functioning of the first vacuum producing means 31.

Figure 3:
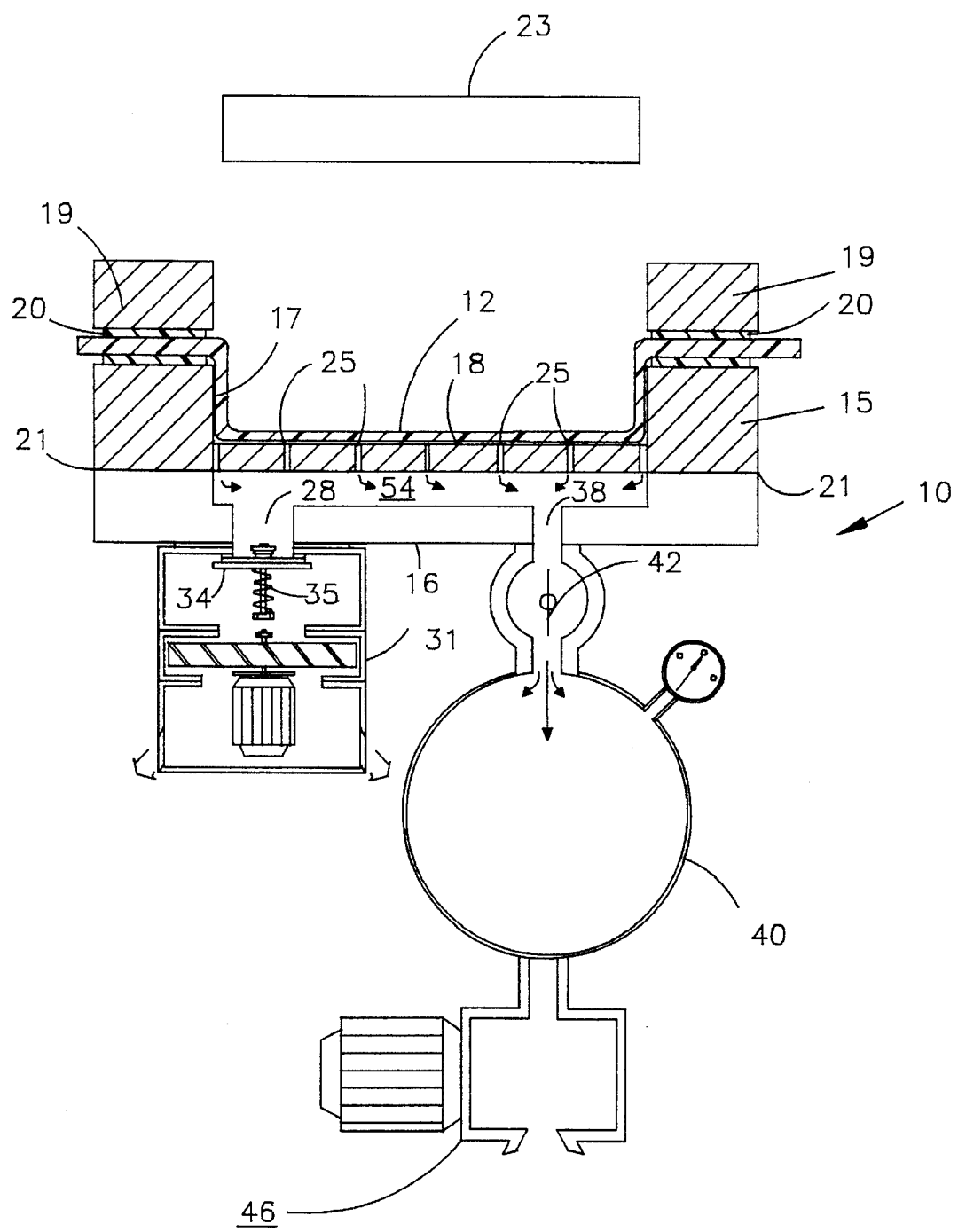
FIG. 3 is a view similar to FIGS. 1 and 2 but with the apparatus and method in another operative position and illustrating the second vacuum producing means connected to the space between the heated film and drawing the heated film into close proximity to the walls or the shape of the mold.

A second port 38 serves to connect a second vacuum producing means to the manifold 54. The second vacuum producing means includes a vacuum tank 40 which is evacuated by means of a vacuum pump 46. A valve sometimes referred to as a dump valve 42 shown in the closed condition in FIGS. 1 and 2 and in the open position in FIG. 3 is provided to control passage of the air from the manifold 54 into the tank 40. Operation of the apparatus and the steps and method are hereinafter described.

The film 12 is positioned in the apparatus as seen in FIG. 1 and heating means 23 is activated. As the film is initially heated, it shrinks slightly which holds it in a relatively taut or horizontal position since it is clamped in place by means of the clamping members 19. As the film is heated further, it sags slightly because of the so-called softening effect. The heating temperature is in the range of from 250 degrees to 450 degrees Fahrenheit depending upon the type of film utilized. The time of heating as a rule of thumb may be on the order 1 second for each one thousandth of an inch of thickness of the film. Air is prevented from entering the space 50 because the film is clamped tightly in position by means of clamping members 19 and by use of the seals 20.

The next step in the method is the actuation of the first vacuum producing means, namely the turbine 31. The actuation of turbine 31 causes air to be evacuated from space 50 by means of the openings 25, manifold 54 and ports 28. The operation of the turbine produces a vacuum beneath the spring biased valve 34 which causes it to open as illustrated in FIG. 2 with subsequent flow of air from the space 50 as illustrated by the small arrows in FIG. 2 and exiting the turbine 31 by means of the large arrows illustrated in FIG. 2.

The first vacuum producing means 31 is of a capacity to enable the removal of on the order of 100–110 cubic feet of air per minute and is able to produce a relatively weak or low vacuum of on the order of 4–5 inches of mercury. This is accomplished in a time frame of 1 second or less as a matter of illustration. The production of the vacuum causes the valve 34 to open as illustrated in FIG. 2 with the subsequent removal of air as indicated by the arrows. This causes the heated film to be drawn into the mold 15 as illustrated in FIG. 2 but not specifically and precisely conforming to the shape of the mold. As mentioned, the removal of air from the space 50 and manifold 54 is accomplished in a time frame of 1 second or less. Upon the first vacuum producing means 31 having produced the four or five inches of mercury vacuum as mentioned hereinabove, the second vacuum producing means 40, 42, 46 is actuated.

This involves the opening of the dump valve 42 along with actuation of the vacuum pump 46 which communicates the remaining space 50 and the manifold 54 to the interior of the tank 40 by way of the valve 42. The interior of the tank 40 has previously been pumped down to a vacuum which is on the order of 27–30 inches of mercury. This immediately exhausts the remaining space 50 causing the film to closely and specifically conform to the shape of the walls of the mold 12 as illustrated in FIG. 3 of the drawings. During this operation the turbine of the first vacuum producing means 31 normally continues to run; however, the valve 34 is maintained in its closed position because of the action of spring 35 and the low pressure in the manifold 54 produced by the second vacuum producing means.

The timing between the end of the first vacuum producing means cycle and the actuation of the second vacuum producing means is not particularly critical and is usually handled by means of simple timing sequence mechanisms.

As a matter of illustration only, the significance of the mechanism of the present invention can be appreciated if one assumes, for example, that the volume of air to be removed from space 50 is for example 6 gallons. One can also assume, for the sake of example, that the volume of tank 40 is on the order 6–12 gallons. The initial actuation of the first vacuum producing means 31 removes essentially all of the air from space 50 as illustrated and in a very short period of time. This is due to the fact that the turbine 31 has a capacity of air removal of on the order of 100 cubic feet per minute and produces a vacuum of 4–5 inches of mercury. When the second vacuum producing means is actuated by opening the dump valve 42, the small remaining amount of air in space 50 is essentially instantaneously removed from space 50 and the manifold 54 reducing that area to a pressure of 27–30 inches of mercury. This draws the film practically instantaneously into the shape or position illustrated in FIG. 3. The second vacuum producing means is needed or required for less time than the first vacuuming producing means which illustrates that the process proceeds very rapidly.

At times and depending upon the construction of the film 12, a dwell time or in the mold time is necessary in order to enable the formed film material to cool so as to retain its molded shape. When water cooling is involved, in most instances no dwell time is required and when air cooling is utilized, sometimes a small dwell time is utilized. Also, although not illustrated here, it is sometimes conventional to connect a source of positive air pressure to the manifold area so as to assist in removing the formed film material from the mold.

It will thus be seen that the objects of the present invention are readily accomplished and the advantages over the prior art are achieved. By the utilization of the first and second vacuum producing means, one can utilize a relatively small tank 40 for use in removing the last vestiges of air remaining in space 50 thus obviating the prior art disadvantages of utilizing an extremely large tank, say of on the order of 600 gallons. The present invention also obviates the alternative prior art method of utilizing an extremely large and expensive pump with a large capacity so as to be able to quickly remove the air from space 50 and produce the vacuum necessary to form the film.

The present invention also accomplishes the desired result of forming the film into its molded shape in a short period of time which does not allow the film to cool before being formed.

The invention has been described in detail with particular emphasis on the preferred embodiments thereof, but it should be understood that variations and modifications within the spirit and scope of the invention may occur to those skilled in the art to which the invention pertains.

I claim:

1. Apparatus for forming a sheet of plastic material into a predetermined shape comprising a mold, positioning means for positioning said sheet above the mold to create an air space therebetween, heating means for heating the sheet to render said sheet soft and moldable, first vacuum means for rapidly removing a first volume of air and producing a first vacuum, first fluid connection means for connecting the air space to the first vacuum means, second vacuum means for rapidly removing a second volume of air and producing a second vacuum, second fluid connection means connecting the air space to the second vacuum means, said first volume of air being greater than said second volume of air and said first vacuum being less than said second vacuum, first valving means for connecting and disconnecting the first vacuum means through the first fluid connection means to the air space beneath the plastic sheet and second valving means for connecting and disconnecting the second vacuum means through the second fluid connection means to the air space beneath the plastic sheet, said first valving means comprising a valve member movable between open and closed positions, said valve member normally biased to a closed position wherein fluid flow is prevented between said first vacuum means and said air space, initial actuation of said first vacuum means causing said valve member to move to said open position and upon production of said first vacuum said valve member biasing to said closed position, thereafter said second valving means being actuated for connecting the second vacuum means to the air space to create said second vacuum in said air space which assists in holding said valve member closed.

2. Apparatus as claimed in claim 1 where the biasing of said valve member is achieved by a spring.

* * * * *